(12) United States Patent
Ohana et al.

(10) Patent No.: US 9,929,865 B2
(45) Date of Patent: Mar. 27, 2018

(54) POWERED DEVICE INTERFACE CLASSIFICATION APPARATUS AND METHOD

(71) Applicant: Microsemi Corp.—Analog Mixed Signal Group, Ltd., Hod Hasharon (IL)

(72) Inventors: Eli Ohana, Kfar Sava (IL); Ohad Vaknin, Ramat Gan (IL)

(73) Assignee: Microsemi P.O.E. Ltd., Hod Hasharon (IL)

( * ) Notice: Subject to any disclaimer, the term of this patent is extended or adjusted under 35 U.S.C. 154(b) by 398 days.

(21) Appl. No.: 14/803,166

(22) Filed: Jul. 20, 2015

(65) Prior Publication Data

US 2016/0056967 A1 Feb. 25, 2016

Related U.S. Application Data

(60) Provisional application No. 62/038,865, filed on Aug. 19, 2014.

(51) Int. Cl.
*H04L 12/10* (2006.01)
*G06F 1/26* (2006.01)
*H04L 12/40* (2006.01)

(52) U.S. Cl.
CPC .............. *H04L 12/10* (2013.01); *G06F 1/26* (2013.01); *G06F 1/266* (2013.01); *H04L 12/40045* (2013.01)

(58) Field of Classification Search
CPC ..... H04L 12/10; H04L 12/40045; G06F 1/28; G06F 1/266; G06F 1/26
See application file for complete search history.

(56) References Cited

U.S. PATENT DOCUMENTS

| 7,460,889 | B2 | 12/2008 | Darshan | |
|---|---|---|---|---|
| 7,516,340 | B2* | 4/2009 | Landry | H04L 12/10 323/316 |
| 8,049,484 | B2* | 11/2011 | Vetteth | H04L 12/4625 323/355 |

OTHER PUBLICATIONS

IEEE Computer Society; "IEEE std 802.af-2003"; pp. 29-57, 94-96, 102, 115; published Jun. 18, 2003; The Institute of Electrical and Electronic Engineers, Inc., New York, NY, 2003.
IEEE Computer Society; "IEEE std 802.at-2009"; pp. 22-67; published Oct. 30, 2009; The Institute of Electrical and Electronic Engineers, Inc., New York, NY, 2003.

* cited by examiner

*Primary Examiner* — Ryan Johnson
(74) *Attorney, Agent, or Firm* — Simon Kahn (57) ABSTRACT

A powered device interface constituted of: a first and second rectifier bridge, the outputs and returns thereof in electrical communication with each other; and a selection circuit; and a classification current circuit in electrical communication with the output and return of each of the first rectifier bridge and the second rectifier bridge, and further in electrical communication with a first and second input of the first rectifier bridge, wherein the classification current circuit is arranged, responsive to a classification voltage received at one of the first rectifier bridge and the second rectifier bridge, to: in the event that the classification voltage is received at the first rectifier bridge, output a first classification current exhibiting a first magnitude; and in the event that the classification voltage is received at the second rectifier bridge, output a second classification current exhibiting a second magnitude.

14 Claims, 4 Drawing Sheets

| 1000 | RECEIVE CLASSIFICATION VOLTAGE AT ONE OF FIRST AND SECOND RECTIFIER BRIDGE, OUTPUTS AND RETURNS OF BRIDGES COUPLED TO EACH OTHER |
|---|---|
| 1010 | IN THE EVENT THAT CLASSIFICATION VOLTAGE RECEIVED AT FIRST BRIDGE, OUTPUT FIRST CLASSIFICATION CURRENT WITH FIRST MAGNITUDE, OPT. GENERATED BY CONTROLLABLE CURRENT SOURCE |
| 1020 | IN THE EVENT THAT CLASSIFICATION VOLTAGE RECEIVED AT SECOND BRIDGE, OUTPUT SECOND CLASSIFICATION CURRENT WITH SECOND MAGNITUDE, DIFFERENT THAT FIRST MAGNITUDE, OPT. GENERATED BY CONTROLLABLE CURRENT SOURCE |
| 1030 | (OPT.) IN THE EVENT THAT CLASSIFICATION VOLTAGE RECEIVED AT FIRST BRIDGE, PRESENT FIRST RESISTANCE TO CONTROL CIRCUIT, FIRST CLASSIFICATION CURRENT RESPONSIVE TO FIRST RESISTANCE; IN THE EVENT THAT CLASSIFICATION VOLTAGE RECEIVED AT SECOND BRIDGE, PRESENT SECOND RESISTANCE TO CONTROL CIRCUIT, SECOND CLASSIFICATON CURRENT RESPONSIVE TO SECOND RESISTANCE |
| 1040 | (OPT.) ONE OF PRESENTATION OF FIRST RESISTANCE AND PRESENTATION OF SECOND RESISTANCE COMPRISES PRESENTING RESISTANCE OF FIRST AND SECOND RESISTIVE ELEMENTS, AND THE OTHER COMPRISES PRESENTING RESISTANCE OF FIRST RESISTIVE ELEMENT AND CONCEALING RESISTANCE OF SECOND RESISTIVE ELEMENT |
| 1050 | (OPT.) ALTERNATELY OPEN AND CLOSE FIRST ELECTRONICALLY CONTROLLED SWITCH, RESISTANCE OF SECOND ELEMENT PRESENTED RESPONSIVE TO FIRST STATE OF SWITCH AND CONCEALED RESPONSIVE TO SECOND STATE OF SWITCH |
| 1060 | (OPT.) RESPONSIVE TO RECEIVING CLASSIFICATION VOLTAGE, CLOSE SECOND ELECTRONICALLY CONTROLLED SWITCH AND RESPONSIVE TO NOT RECEIVING CLASSIFICATION VOLTAGE, OPEN SECOND ELECTRONICALLY CONTROLLED SWITCH, FIRST SWITCH CLOSED ONLY WHEN SECOND SWITCH CLOSED |

POWERED DEVICE INTERFACE CLASSIFICATION APPARATUS AND METHOD

TECHNICAL FIELD

The invention relates generally to the field of power over Ethernet (PoE), and in particular to a powered device (PD) interface classification apparatus and method.

BACKGROUND

Power over Ethernet (PoE), in accordance with both IEEE 802.3af-2003, and IEEE 802.3at-2009, each published by the Institute of Electrical and Electronics Engineers, Inc., New York, the entire contents of each of which is incorporated herein by reference, defines delivery of power over a set of 2 twisted wire pairs without disturbing data communication. The aforementioned standards particularly provide for a power sourcing equipment (PSE) and a powered device (PD). IEEE 802.3af-2003 is referred to herein as the "af" standard and IEEE 802.3at-2009 is referred to herein as the "at" standard.

The "af" standard limits the amount of power provided over a set of 2 twisted wire pairs to a PD to 12.95 watts, and the "at" standard limits the amount of power provided over a set of 2 twisted wire pairs to a PD to 30 watts. If power is provided over 4 twisted wire pairs, which is not covered the above two standards, up to 60 watts of power can be provided to a PD.

In order to improve overall system power and load management, the "af" standard provides for PD classification to one of 4 potential classes. Each class exhibits a range of maximum power drawn by the PD. The "at" standard further provides for an additional class. Particularly, class 0 is defined as a default class in which no power requirement information is supplied by the PD and thus the PSE is required to provide up to 15.4 watts to the PD. For a class 1 PD, the PSE is required to supply power of up to 4 watts. For a class 2 PD, the PSE is required to supply power of up to 7 watts. For a class 3 PD, the PSE is required to supply power of up to 15.4 watts. For a class 4 PD, the PSE is required to supply power of up to 30 watts. As described above, the "at" standard allows for a maximum power supply of 30 watts over 2 twisted wire pairs and utilizing 4 twisted wire pairs thus allows supply of up to 60 watts of power. Unfortunately, only a single class is provided for all high powered devices with power requirements of 15.4-60 watts. Therefore, power and load management cannot be provided for high powered devices.

What is needed, and not supplied by the prior art, is a method of classification for high powered devices which is unambiguous, is compatible with prior art classification under the "af" and "at" standards, and conforms to both the PD and the PSE the characteristics of the coupled device.

SUMMARY OF THE INVENTION

Accordingly, it is a principal object of the present invention to overcome the disadvantages of prior art PoE systems. This is accomplished in certain embodiments by a powered device (PD) interface comprising: a first rectifier bridge; a second rectifier bridge, different than the first rectifier bridge, an output of the second rectifier bridge in electrical communication with an output of the first rectifier bridge and a return of the second rectifier bridge in electrical communication with a return of the first rectifier bridge; and a classification current circuit in electrical communication with the output and return of each of the first rectifier bridge and the second rectifier bridge, and further in electrical communication with a first and second input of the first rectifier bridge, wherein the classification current circuit is arranged, responsive to a classification voltage received at one of the first rectifier bridge and the second rectifier bridge, to: in the event that the classification voltage is received at the first rectifier bridge, output a first classification current exhibiting a magnitude of a first predetermined current value; and in the event that the classification voltage is received at the second rectifier bridge, output a second classification current exhibiting a magnitude of a second predetermined current value different that the first predetermined current value.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 3 illustrates a high level flow chart of a PD interface classification method, according to certain embodiments.

DETAILED DESCRIPTION OF THE PREFERRED EMBODIMENTS

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. The term 'resistor' as used herein is meant to include any element which provides a predetermined resistance. The term 'coupled' as used herein is not limited to a direct connection, and appropriate electrical elements and circuits may be between two 'coupled' elements, without exceeding the scope. The term 'electrical communication' as used herein is meant to include a direct connection as well as a connection via various electrical elements and circuits.

Figure 1A:
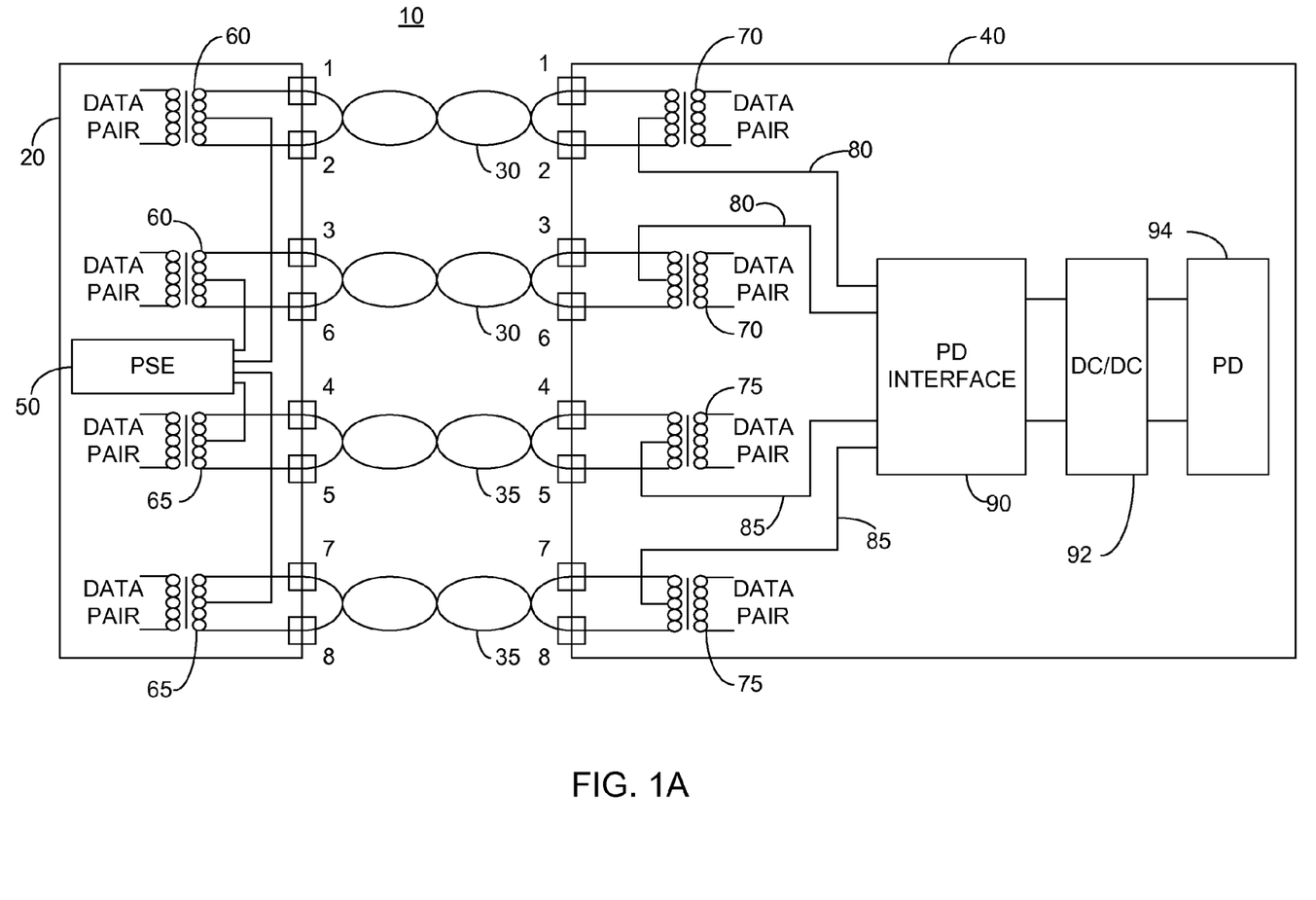
FIG. 1A illustrates a high level schematic diagram of a PoE arrangement comprising a PoE switch/hub, a PD interface and a PD, according to certain embodiments.

FIG. 1A illustrates a high level schematic diagram of a PoE system 10 comprising: a switch/hub 20; two twisted wire pairs 30; two twisted wire pairs 35; and a PD arrangement 40. Switch/hub 20 comprises: a PSE 50; a pair of data transformers 60; and a pair of data transformers 65. PD arrangement 40 comprises: a pair of data transformers 70; a pair of data transformers 75; a pair of electrical paths 80; a pair of electrical paths 85; a PD interface 90; a DC/DC power converter 92; and a PD 94. A data pair is coupled across the primary winding of each data transformer 60 in switch/hub 20 and a first end of each twisted wire pair 30 is coupled across the secondary winding of each data transformer 60 in switch/hub 20 via respective connections, listed conventionally as connections 1, 2, 3, 6. A further data pair is coupled across the primary winding of each data transformer 65 in switch/hub 20 and a first end of each twisted wire pair 35 is coupled across the secondary winding of each data transformer 65 in switch/hub 20 via respective connections, listed conventionally as connections 4, 5, 7 and 8. The outputs of PSE 50 are respectively coupled to the center taps of the secondary windings of data transformers 60, 65 of switch/hub 20.

A data pair is coupled across the primary winding of each data transformer 70 in PD arrangement 40 and a second end of each twisted wire pair 30 is coupled across the secondary winding of each data transformer 70 in PD arrangement 40 via respective connections, listed conventionally as connections 1, 2, 3, 6. A further data pair is coupled across the primary winding of each data transformer 75 in PD arrangement 40 and a second end of each twisted wire pair 35 is coupled across the secondary winding of each data transformer 75 in PD arrangement 40 via respective connections, listed conventionally as connections 4, 5, 7 and 8. A first pair of inputs of PD interface 90 are respectively coupled to the center taps of the secondary windings of data transformers 70 via respective electrical paths 80. A second pair of inputs of PD interface 90 are respectively coupled to the center taps of the secondary windings of data transformers 75 via respective electrical paths 85. PD 94 is coupled to PD interface 90 via DC/DC power converter 92.

PSE 50 is illustrated as being part of switch/hub 20 however this is not meant to be limiting in any way, and midspan equipment may be utilized to provide a connection for PSE 50 without exceeding the scope. PSE 50 may be any equipment arranged to provide power over communication cabling, including equipment meeting the definition of a PSE under IEEE 802.3at, without limitation. The operation of PoE system 10 will be described below in relation to FIG. 1B.

Figure 1B:
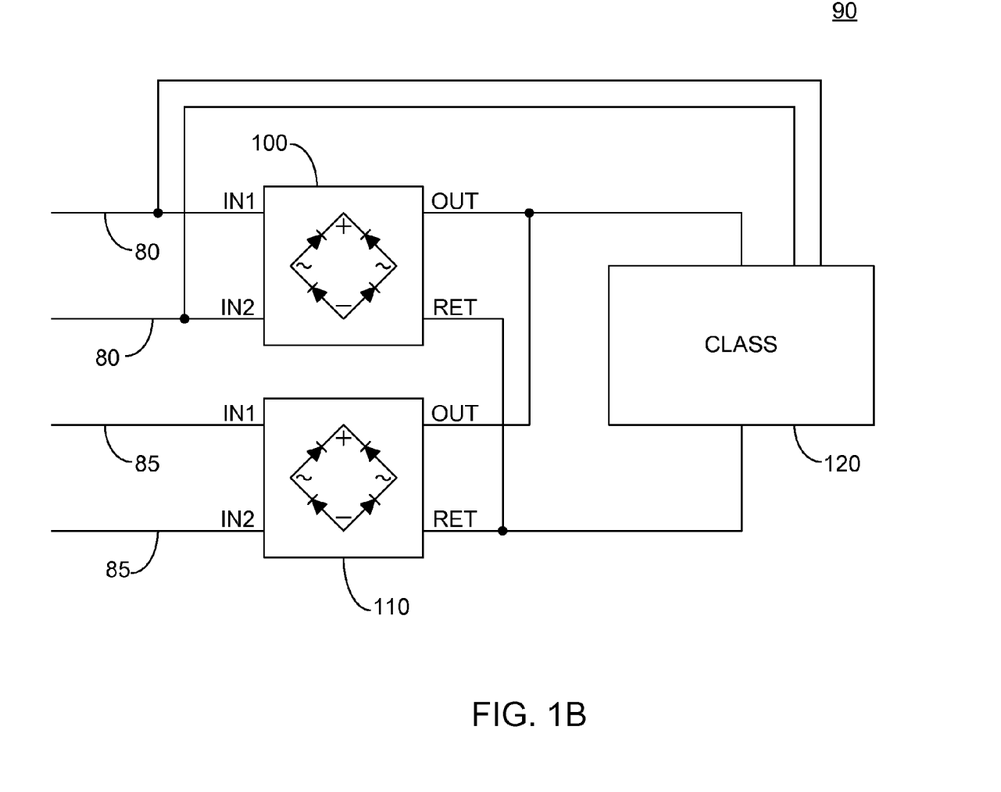
FIG. 1B illustrates a high level schematic diagram of the PD interface of FIG. 1A, according to certain embodiments.

FIG. 1B illustrates a high level schematic diagram of PD interface 90, the operation of FIGS. 1A-1B being described together. As illustrated in FIG. 1B, PD interface 90 comprises: a first rectifier bridge 100; a second rectifier bridge 110; and a classification current circuit 120. In one embodiment, first rectifier bridge 100 and second rectifier bridge 110 each comprise a diode bridge. In one further embodiment, first rectifier bridge 100 and second rectifier bridge 110 each comprise an ideal diode bridge with a plurality of electronically controlled switches. The inputs of first rectifier bridge 100, denoted IN1 and IN2, are each coupled to a respective electrical path 80 and the inputs of second rectifier bridge 110, also denoted IN1 and IN2, are each coupled to a respective electrical path 85. An output of first rectifier bridge 100, denoted OUT, is coupled to an output of second rectifier bridge 110, also denoted OUT, and is further coupled to a first terminal of classification current circuit 120. A return of first rectifier bridge 100, denoted RET, is coupled to an output of second rectifier bridge 110, also denoted RET, and is further coupled to a second terminal of classification current circuit 120. A third terminal of classification current circuit 120 is coupled to input IN1 of first diode bridge 100 and a fourth terminal of classification current circuit 120 is coupled to input IN2 of first diode bridge 100.

In operation, during a classification stage, PSE 50 outputs a classification voltage over twisted wire pairs 30, a first twisted wire pair 30 being the power path of the classification voltage and a second twisted wire pair 30 being the return path of the classification voltage, with polarity independence provided by first rectifier bridge 100. In one embodiment, the classification voltage output by PSE 50 is 15.5-20.5 Volts. The classification voltage is output by PSE 50 for a first predetermined classification voltage time period. The classification voltage of PSE 50 is extracted from twisted wire pairs 30 and is transferred to inputs IN1, IN2 of first rectifier bridge 100 of PD interface 90, via the primary windings of data transformers 70 and electrical paths 80. Classification current circuit 120 is arranged to output a predetermined classification current responsive to the received classification voltage of PSE 50, as will be described below. At the completion of the first classification time period, PSE 50 is arranged to output a second classification voltage over twisted wire pairs 35, a first twisted wire pair 35 being the power path of the second classification voltage and a second twisted wire pair 35 being the return path of the second classification voltage, with polarity independence provided by second rectifier bridge 110. The second classification voltage is output by PSE 50 for a second predetermined classification time period, preferably the same as the first classification time period. The second classification voltage is extracted from twisted wire pairs 35 and is transferred to inputs IN1, IN2 of second rectifier bridge 110 of PD interface 90, via the primary windings of data transformers 75 and electrical paths 85. Classification current circuit 120 is arranged to output a second predetermined classification current responsive to the received second classification voltage, as will be described below. In one embodiment, a predetermined idle time period elapses between the end of the first classification time period and the beginning of the second classification time period.

Classification current circuit 120 is arranged to output a classification current responsive to a received classification voltage from any of twisted wire pairs 30 and twisted wire pairs 35, the classification current exhibiting a first magnitude when a classification voltage is provided over twisted wire pairs 30 and exhibiting a second magnitude when a classification voltage is output over twisted wire pairs 35, as will be described below. The classification currents are received by PSE 50 and PSE 50 is arranged to determine the class of PD 94, i.e. the power requirements, responsive to the magnitudes of the combination of classification currents. The magnitude of the classification current received when a classification voltage is output over twisted wire pairs 30 provides a first indication of the class of PD 94 and the magnitude of the classification current received when a classification voltage is output over twisted wire pairs 35 provides a second indication of the class of PD 94. Particularly, as defined in the above "af" and "at" standards, a classification current of 0-5 mA indicates a class 0 classification, a classification current of 8-13 mA indicates a class 1 classification, a classification current of 16-21 mA indicates a class 2 classification, a classification current of 25-31 mA indicates a class 3 classification and a classification current of 35 mA to 45 mA indicates a class 4 classification. When the classification voltage is provided over twisted wire pairs 30, classification current circuit 120 is arranged to output a first classification current indicative of class 4. When the classification voltage is provided over twisted wire pairs 35, classification current circuit 120 is arranged to output a second classification current indicative of one of classes 0-4. As a result, the first and second classification currents provide 5 different class options for PD 94, i.e. class 4/0, class 4/1, class 4/2, class 4/4 and class 4/4. Advantageously, 5 classes are thus available for high powered PDs, which improves granularity.

Responsive to both first and second classification currents, PSE 50 is arranged to determine the class of PD 94. If enough power is available to provide to PD 94, PSE 50 outputs DC power to PD 94 via twisted wire pairs 30, 35, PD interface 90 and DC/DC converter 92.

Figure 2:
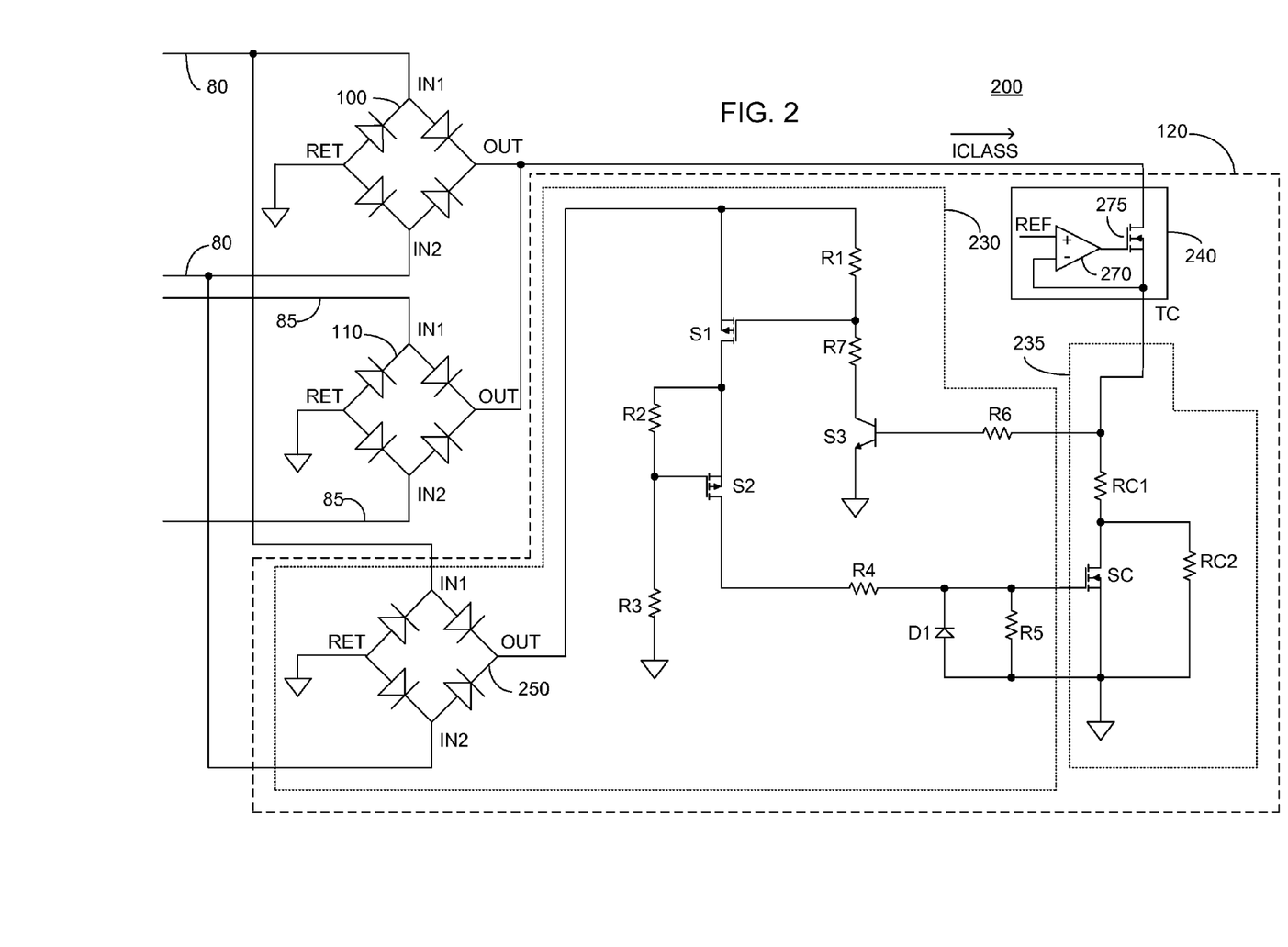
FIG. 2 illustrates a detailed high level schematic diagram of a PD interface, according to certain embodiments.

FIG. 2 illustrates a high level schematic diagram of a PD interface 200, comprising: first rectifier bridge 100, illustrated without limitation as a diode bridge; second rectifier bridge 110, illustrated without limitation as a diode bridge; and a non-limiting more detailed embodiment of classification current circuit 120. Classification current circuit 120 comprises: a selection circuit 230; an adjustable resistive circuit 235; and a controllable current source 240. Selection circuit 230 comprises: a third rectifier bridge 250, illustrated without limitation as a diode bridge; a plurality of resistors R1, R2, R3, R4, R5, R6 and R7; a plurality of electronically controlled switches S1, S2 and S3; and a Zener, or avalanche, diode D1. Adjustable resistive circuit 235 comprises: a pair of resistors RC1 and RC2; and an electronically controlled switch SC. In one embodiment (not shown), first rectifier bridge 100 and second rectifier bridge 110 each comprise an ideal diode bridge. In another embodiment, electronically controlled switches S1 and S2 each comprise a p-channel metal-oxide-semiconductor field-effect transistor (PFET), and are described herein as such. In one embodiment, electronically controlled switch S3 comprises an NPN type bipolar junction transistor (BJT), and is described herein as such. In another embodiment, electronically controlled switch SC comprises an n-channel metal-oxide-semiconductor field-effect transistor (NFET), and is described herein as such. In one embodiment, controllable current source 240 is provided within a PD interface controller, such as front-end PD interface controller PD70210, commercially available from Microsemi Corporation of Aliso Viejo, Calif. Controllable current source 240 comprises a reference voltage REF, a differential amplifier 270 and an NFET 275.

The inputs of first rectifier bridge 100, denoted respectively IN1 and IN2, are each coupled to a respective electrical path 80. The inputs of second rectifier bridge 110, denoted respectively IN1 and IN2, are each coupled to a respective electrical path 85. The returns of first rectifier bridge 100 and second rectifier bridge 110, denoted RET, are each coupled to a common potential. The outputs of first rectifier bridge 100 and second rectifier bridge 110 are commonly coupled via a first terminal of controllable current source 240 to the drain of NFET 275, and are each denoted OUT. Input IN1 of first rectifier bridge 100 is coupled to a first input of third rectifier bridge 250, also denoted IN1. Input IN2 of first rectifier bridge 100 is coupled to a second input of third rectifier bridge 250, also denoted IN2. The output of third rectifier bridge 250, denoted OUT, is coupled to the source of PFET S1 and a first end of resistor R1. The drain of PFET S1 is coupled to a first end of resistor R2 and the source of PFET S2. The second end of resistor R2 is coupled to the gate of PFET S2 and to a first end of resistor R3. The second end of resistor R3 is coupled to the common potential. The drain of PFET S2 is coupled to a first end of resistor R4. The second end of resistor R4 is coupled to the cathode of Zener diode D1, a first end of resistor R5 and the gate of NFET SC. The source of NMOSFET 275 is coupled to the inverting input of differential amplifier 270, and the output of differential amplifier 270 is coupled to the gate of NFET 275. Reference voltage REF is coupled to the non-inverting input of differential amplifier 270, and a second terminal of controllable current source 240, denoted terminal TC, is coupled to the drain of NFET 275, to a first end of resistor R6 and to a first end of resistor RC1. A second end of resistor RC1 is coupled to the drain of NFET SC and to a first end of resistor RC2. A second end of each of resistor RC2, resistor R5, the anode of Zener diode D1 and the source of NFET SC are each coupled to the common potential. The second end of resistor R6 is coupled to the base of BJT S3 and the emitter of BJT S3 is coupled to the common potential. The collector of BJT S3 is coupled to a first end of resistor R7. The second end of resistor R7 is coupled to the second end of resistor R1 and the gate of PFET S1. The return of third rectifier bridge 250, denoted RET, is coupled to the common potential.

In operation, as described above in relation to PD interface 90 of FIGS. 1A-1B, controllable current source 240, responsive to selection circuit 230 and adjustable resistive circuit 235, is arranged to output a first classification current ICLASS(1) exhibiting a first magnitude when a classification voltage is received over electrical paths 80 and output a second classification current ICLASS(2) exhibiting a second magnitude when a classification voltage is received over electrical paths 85. Adjustable resistive circuit 235 is controlled responsive to the output of selection circuit 230, as will be described further below. The classification current ICLASS is driven by the feedback combination of NFET 275 and differential amplifier 270 with its amount responsive to the value of reference voltage REF and the effective resistance seen at terminal TC. In the event that NFET SC is closed, terminal TC sees resistor RC1, ignoring the path of R6, which is of high impedance and fixed. In the event that NFET SC is open, terminal TC sees the series combination of resistors RC1 and RC2, ignoring the path of resistor R6, which is of high impedance and fixed.

Particularly, in the event that a classification voltage is received by controllable current source 240 via electrical paths 80 or electrical paths 85, and the respective one of first rectifier bridge 100 and second rectifier bridge 110, classification current ICLASS is developed whose value is responsive the resistance between terminal TC of controllable current source 240 and the common potential.

Classification current ICLASS flows through terminal TC. The major portion of classification current ICLASS flows through resistor RC1, and in the event that NFET SC is in the open state, through resistor RC2. Some of the classification current flows through R6 and activates BJT S3, thereby causing a current to flow through the collector thereof. In the event that a classification voltage is present across inputs IN1 and IN2 of first rectifier bridge 100, the classification voltage is further output by third rectifier bridge 250 and presented at the source of PFET S1 and the first end of resistor R1. The collector current of BJT S3 produces a voltage drop across resistor R1 and the potential difference between the source and gate of PFET S1 closes PFET S1. The potential at the drain of PFET S1 is divided by resistors R2 and R3 and the potential difference between the gate and source of PFET S2 closes PFET S2. Thus, the potential at output OUT of third rectifier bridge 250 is presented at the drain of PFET S2 and then divided by resistors R4 and R5. The divided voltage closes NFET SC and shorts out resistor RC2 such that only the resistance of resistor RC1 is presented at terminal TC of controllable current source 240 and the resistance of resistor RC2 is concealed from controllable current source 240. Classification current ICLASS is thus set to a value responsive to reference voltage REF and the resistive value of resistor RC1. The value of RC1, in combination with the value of reference voltage REF is set to output a class 4 classification current ICLASS, i.e. a current exhibiting a magnitude of 35-45 mA. In one embodiment reference voltage REF is set to 1.2 volts.

In the event that a classification voltage is present across inputs IN1 and IN2 of second rectifier bridge 110 and not across inputs IN1 and IN2 of first rectifier bridge 100, PFET S1, PFET S2 and BJT S3 will not be activated since the voltage across output OUT and return RET of third rectifier bridge 250 is zero. As a result, NFET SC is open and the resistance presented to controllable current source 240 at terminal TC by adjustable resistive circuit 235 comprises the combined series resistance of resistors RC1 and RC2, which thus sets the amount of current output by controllable current source 240 to a value indicative of one of classes 0-3, responsive to the combined values of RC1 and RC2, with the value of RC2 in particular selected by the user so as to generate the desired classification current value. In order to output a class 4 classification current, selection circuit 230 is not needed and only resistor RC1 is provided for such a PD.

In the event that a classification voltage is not present across inputs IN1 and IN2 of either of first rectifier bridge 100 and second rectifier bridge 110, no current is generated by controllable current source 240. Particularly, a current is provided at terminal TC only when a classification voltage of 15.5-20.5 V is provided to controllable current source 240. As a result, BJT S3 and PFETs S1 and S2 will remain open and no power will be drawn by selection circuit 230. Thus, advantageously selection circuit 230 draws power only when a classification voltage is being presented to PD interface 200.

The above has been described in an embodiment where the resistance of resistor RC1 is presented to terminal TC of controllable current source 240 when a classification voltage is present at first rectifier bridge 100 and the combined resistance of resistor RC1 and resistor RC2 is presented to controllable current source 240 when a classification voltage is present at second rectifier bridge 110, however this is not meant to be limiting in any way. In another embodiment (not shown), resistor RC1 and resistor RC2 are coupled in parallel, the parallel combination thereof presented to controllable current source 240 when a classification voltage is present at first rectifier bridge 100 and the resistance of resistor RC1 presented to controllable current source 240 when a classification voltage is present at second rectifier bridge 110, NFET SC arranged to open the current path of resistor RC2 responsive to an open state thereof.

FIG. 3 illustrates a high level flow chart of a PD interface classification method, according to certain embodiments. In stage 1000, a classification voltage is received at one of a first rectifier bridge and a second rectifier bridge, an output of the second rectifier bridge in electrical communication with an output of the first rectifier bridge and a return of the second rectifier bridge in electrical communication with a return of the first rectifier bridge.

In stage 1010, in the event that the classification voltage of stage 1000 is received at the first rectifier bridge, a first classification current is output, the first classification current exhibiting a magnitude of a first predetermined current value. Optionally, the first classification current is generated by a controllable current source.

In stage 1020, in the event that the classification voltage of stage 1000 is received at the second rectifier bridge, a second classification current is output, the second classification current exhibiting a magnitude of a second predetermined current value different than the first predetermined current value of stage 1010. Optionally, the second classification current is generated by the optional controllable current source of stage 1010.

In optional stage 1030, in the event that the classification voltage of stage 1000 is received at the first rectifier bridge, a first resistance is presented to a control circuit of the optional controllable current source of stages 1010-1020, the first classification current of stage 1010 generated responsive to the presented first resistance. Additionally, in the event that the classification voltage of stage 1000 is received at the second rectifier bridge, a second resistance is presented to the control circuit of optional controllable current source of stages 1010-1020, the second classification current of stage 1020 generated responsive to the presented second resistance. The second resistance is different that the first resistance.

In optional stage 1040, one of the presentation of the first resistance and the presentation of the second resistance of optional stage 1030 comprises presenting both a resistance of a first resistive element and a resistance of a second resistive element to the control circuit of the optional controllable current source. The other of the presentation of the first resistance and the presentation of the second resistance of optional stage 1030 comprises presenting the resistance of the first resistive element to the control circuit of the optional controllable current source and concealing the resistance of the second resistive element from the control circuit of the optional controllable current source.

In optional stage 1050, a first electronically controlled switch, such as NFET SC, is alternately opened and closed. The second resistive element of optional stage 1040 is presented to the control circuit of optional controllable current source of stages 1010-1020 responsive to a first state of the first electronically controlled switch. The second resistive element of optional stage 1040 is concealed from the control circuit of optional controllable current source responsive to a second state of the first electronically controlled switch, the second state opposing the first state, i.e. one of the first state and the second state is a closed state and the other is an open state. In one embodiment, the second resistive element is coupled in parallel to the first resistive element. When the first electronically controlled switch is closed, a short circuit is presented in parallel to the second resistive element thereby concealing the resistance of the second resistive element from the control circuit of the optional controllable current source. When the first electronically controlled switch is open, a short circuit is not presented in parallel to the second resistive element and the second resistive element is coupled in series with the first resistive element. In another embodiment, the second resistive element is coupled in parallel to the first resistive element. When the first electronically controlled switch is open, the current path of the second resistive element is open and the parallel coupling of the first and second resistive elements is opened, thereby concealing the resistance of the second resistive element from the control circuit of the optional controllable current source. When the first electronically controlled switch is closed, the parallel coupling of the first and second resistive elements is maintained, thereby presenting the parallel resistance of the first and second resistive elements to the control circuit of the optional controllable current source.

In optional stage 1060, responsive to the receiving of the classification voltage at one of the first rectifier bridge and the second rectifier bridge, closing a second electronically controlled switch, such as BJT S3; and responsive to not receiving the classification voltage at either of the first rectifier bridge and the second rectifier bridge, opening the second electronically controlled switch, wherein closing the first electronically controlled switch is only in the event that the second electronically controlled switch is closed. Optionally, the second electronically controlled switch is closed responsive to the classification current ICLASS output by the optional controllable current source of stages 1010-1020, the classification current ICLASS output only when a classification voltage is detected across the optional controllable current source.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

The terms "include", "comprise" and "have" and their conjugates as used herein mean "including but not necessarily limited to".

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

The invention claimed is:

1. A powered device (PD) interface arranged to received power from a power sourcing equipment over 4 twisted wire pairs, the PD comprising:
    a first rectifier bridge, an input of said first bridge rectifier coupled to a first 2 of the twisted wire pairs;
    a second rectifier bridge, different than said first rectifier bridge, an input of said second bridge rectifier coupled to a second 2 of the twisted wire pairs, an output of said second rectifier bridge coupled to an output of said first rectifier bridge and a return of said second rectifier bridge coupled to a return of said first rectifier bridge;
    a third rectifier bridge, different than said first rectifier bridge and said second rectifier bridge, an input of said third rectifier bridge coupled to the first 2 of the twisted wire pairs; and
    a classification current circuit in electrical communication with said output and return of each of said first rectifier bridge and said second rectifier bridge, and responsive to an output of said third rectifier bridge,
    wherein said classification current circuit is arranged, responsive to a classification voltage received at the input of said first rectifier bridge and observed at an output of said third rectifier bridge, to output a first classification current exhibiting a magnitude of a first predetermined current value, and wherein said classification current circuit is arranged, responsive to the classification voltage received at the input of said second rectifier bridge, and not observed at the output of said third rectifier bridge, to output a second classification current exhibiting a magnitude of a second predetermined current value different than said first predetermined current value.

2. The PD interface of claim 1, wherein said classification current circuit comprises:
    an adjustable resistive circuit arranged to alternately present a first resistance and a second resistance, said second resistance different than said first resistance; and
    a controllable current source in electrical communication with said adjustable resistive circuit, said controllable current source arranged to generate said first classification current responsive to said presented first resistance and generate said second classification current responsive to said presented second resistance,
    wherein said adjustable resistive circuit is arranged to:
        present said first resistance when the classification voltage is received at said first rectifier bridge and observed at the output of said third rectifier bridge; and
        present said second resistance when the classification voltage is received at said second rectifier bridge and not observed at the output of said third rectifier bridge.

3. The PD interface of claim 2, wherein said adjustable resistive circuit comprises a first resistive element and a second resistive element,
    wherein one of said arrangement to present said first resistance and said arrangement to present said second resistance comprises an arrangement to present both a resistance of said first resistive element and a resistance of said second resistive element to said controllable current source and the other of said arrangement to present said first resistance and said arrangement to present said second resistance comprises an arrangement to present the resistance of said first resistive element to said controllable current source and an arrangement to conceal the resistance of said second resistive element from said controllable current source.

4. The PD interface of claim 3, wherein said adjustable resistive circuit further comprises a first electronically controlled switch in electrical communication with said second resistive element, said presentation of said second resistive element responsive to a first state of said first electronically controlled switch and said concealment of said second resistive element responsive to a second state of said first electronically controlled switch, said second state opposing said first state.

5. The PD interface of claim 4, wherein said classification circuit further comprises a second electronically controlled switch,
wherein an output of said adjustable resistive circuit is coupled to a terminal of said controllable current source, said terminal of said controllable current source arranged to output one of said first and second classification currents when the classification voltage is received at one of said first rectifier bridge and said second rectifier bridge and not output either of said first and second classification currents when the classification voltage is not received at either of said first rectifier bridge and said second rectifier bridge, and
wherein said second electronically controlled switch is arranged to be in a closed state when said one of said first and second classification currents is output at said terminal of said controllable current source and be in an open state when said one of said first and second classification currents is not output at said terminal of said controllable current source, said classification current circuit arranged to not draw power responsive to the open state of said second electronically controlled switch.

6. A powered device (PD) interface classification method comprising:
receiving a classification voltage at an input one of a first rectifier bridge in parallel with a third rectifier bridge and a second rectifier bridge, an output of the second rectifier bridge coupled to an output of the first rectifier bridge and a return of the second rectifier bridge coupled to a return of the first rectifier bridge;
in the event that the classification voltage is received at the first rectifier bridge, and appears at an output of said third rectifier bridge, outputting a first classification current exhibiting a magnitude of a first predetermined current value; and
in the event that the classification voltage is received at the second rectifier bridge, and does not appear at the output of said third rectifier bridge, outputting a second classification current exhibiting a magnitude of a second predetermined current value different than said first predetermined current value.

7. The method of claim 6, wherein said first classification current and said second classification current are generated by a controllable current source, the method further comprising:
in the event that the classification voltage is received at the first rectifier bridge and appears at an output of said third rectifier bridge, presenting a first resistance to the controllable current source, said first classification current generated responsive to said presented first resistance; and
in the event that the classification voltage is received at the second rectifier bridge and does not appear at an output of said third rectifier bridge, presenting a second resistance to the controllable current source, different than said first resistance, said second classification current generated responsive to said presented second resistance.

8. The method of claim 7, wherein one of said presenting said first resistance and said presenting said second resistance comprises presenting both a resistance of a first resistive element and a resistance of a second resistive element to the controllable current source and the other of said presenting said first resistance and said presenting said second resistance comprises presenting the resistance of the first resistive element to the controllable current source and concealing the resistance of the second resistive element from the controllable current source.

9. The method of claim 8, further comprising alternately opening and closing a first electronically controlled switch, said presenting the resistance of the second resistive element responsive to a first state of the first electronically controlled switch and said concealing the resistance of the second resistive element responsive to a second state of the first electronically controlled switch, said second state opposing said first state.

10. The method of claim 9, further comprising:
responsive to said receiving the classification voltage at one of the first rectifier bridge and the second rectifier bridge, closing a second electronically controlled switch; and
responsive to not receiving the classification voltage at either of the first rectifier bridge and the second rectifier bridge, opening the second electronically controlled switch,
wherein said closing said first electronically controlled switch is only in the event that the second electronically controlled switch is closed.

11. A powered device (PD) interface comprising:
a first rectifier bridge;
a second rectifier bridge, different than said first rectifier bridge, an output of said second rectifier bridge in electrical communication with an output of said first rectifier bridge and a return of said second rectifier bridge in electrical communication with a return of said first rectifier bridge; and
a classification current circuit in electrical communication with said output and return of each of said first rectifier bridge and said second rectifier bridge, and further in electrical communication with a first and second input of said first rectifier bridge, said classification current circuit comprising:
an adjustable resistive circuit arranged to alternately present a first resistance and a second resistance, said second resistance different than said first resistance; and
a controllable current source in electrical communication with said adjustable resistive circuit, said controllable current source arranged to generate said first classification current responsive to said presented first resistance and generate said second classification current responsive to said presented second resistance,
wherein said adjustable resistive circuit is arranged to present said first resistance when the classification voltage is received at said first rectifier bridge and present said second resistance when the classification voltage is received at said second rectifier bridge, and
wherein said classification current circuit is arranged, responsive to a classification voltage received at said first rectifier bridge, to output a first classification current exhibiting a magnitude of a first predetermined current value, and
wherein said classification current circuit is arranged, responsive to classification voltage received at said second rectifier bridge, to output a second classification current exhibiting a magnitude of a second predetermined current value different than said first predetermined current value.

12. The PD interface of claim 11, wherein said adjustable resistive circuit comprises a first resistive element and a second resistive element, wherein one of said arrangement to present said first resistance and said arrangement to present said second resistance comprises an arrangement to present both a resistance of said first resistive element and a resistance of said second resistive element to said controllable current source and the other of said arrangement to present said first resistance and said arrangement to present said second resistance comprises an arrangement to present the resistance of said first resistive element to said controllable current source and an arrangement to conceal the resistance of said second resistive element from said controllable current source.

13. The PD interface of claim 12, wherein said adjustable resistive circuit further comprises a first electronically controlled switch in electrical communication with said second resistive element, said presentation of said second resistive element responsive to a first state of said first electronically controlled switch and said concealment of said second resistive element responsive to a second state of said first electronically controlled switch, said second state opposing said first state.

14. The PD interface of claim 13, wherein said classification circuit further comprises a second electronically controlled switch, wherein an output of said adjustable resistive circuit is coupled to a terminal of said controllable current source, said terminal of said controllable current source arranged to output one of said first and second classification currents when the classification voltage is received at one of said first rectifier bridge and said second rectifier bridge and not output either of said first and second classification currents when the classification voltage is not received at either of said first rectifier bridge and said second rectifier bridge, and wherein said second electronically controlled switch is arranged to be in a closed state when said one of said first and second classification currents is output at said terminal of said controllable current source and be in an open state when said one of said first and second classification currents is not output at said terminal of said controllable current source, said classification current circuit arranged to not draw power responsive to the open state of said second electronically controlled switch.

\* \* \* \* \*